(12) United States Patent
Hosokai et al.

(10) Patent No.: US 12,468,355 B2
(45) Date of Patent: Nov. 11, 2025

(54) ELECTRONIC APPARATUS

(71) Applicant: LENOVO (SINGAPORE) PTE. LTD., Singapore (SG)

(72) Inventors: Tatsuya Hosokai, Yokohama (JP); Kazuya Umejima, Yokohama (JP); Shigehiro Horiuchi, Yokohama (JP); Tetsuya Sano, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 127 days.

(21) Appl. No.: 18/628,263

(22) Filed: Apr. 5, 2024

(65) Prior Publication Data

US 2024/0393842 A1 Nov. 28, 2024

(30) Foreign Application Priority Data

May 24, 2023 (JP) ................. 2023-085188

(51) Int. Cl.
*G06F 1/16* (2006.01)
*H04R 1/02* (2006.01)

(52) U.S. Cl.
CPC ............ *G06F 1/1688* (2013.01); *H04R 1/028* (2013.01)

(58) Field of Classification Search
CPC .............................. G06F 1/1688; G06F 1/1605
See application file for complete search history.

(56) References Cited

U.S. PATENT DOCUMENTS

| | | | | |
|---|---|---|---|---|
| 5,838,537 A | * | 11/1998 | Lundgren | G06F 1/1688 361/679.27 |
| 7,963,709 B2 | * | 6/2011 | Watanabe | G06F 1/1662 400/472 |
| 10,963,021 B2 | * | 3/2021 | Chang | G06F 1/1688 |
| 2005/0069159 A1 | * | 3/2005 | Nakazato | G06F 1/1616 381/388 |
| 2024/0393838 A1 | * | 11/2024 | Nakanishi | H01R 12/62 |

FOREIGN PATENT DOCUMENTS

| | | | |
|---|---|---|---|
| JP | 2012069478 A | | 4/2012 |
| JP | 2014013464 A | * | 1/2014 |
| JP | 2021090099 A | | 6/2021 |

* cited by examiner

*Primary Examiner* — Nidhi Thaker
(74) *Attorney, Agent, or Firm* — SHIMOKAJI IP

(57) ABSTRACT

An electronic apparatus includes a pair of speakers in a chassis. The pair of speakers are connected via a flat cable. The flat cable has a ridge fold line that is convex on one face and a valley fold line that is convex on the other face so that the ridge and valley fold lines extend in a direction intersecting an extension direction of the flat cable. The chassis has a flat shape, and the flat cable is placed along the flat surface and has a long extending portion partially overlaps a protrusion of a battery in a plan view.

3 Claims, 9 Drawing Sheets

ELECTRONIC APPARATUS

BACKGROUND OF THE INVENTION

Field of the Invention

The present invention relates to an electronic apparatus having a pair of speakers in the chassis.

Description of the Related Art

Some electronic apparatuses such as laptop personal computers (hereafter called "laptop PCs") and tablet PCs include a pair of speakers in the main body chassis including the keyboard. A pair of speakers are placed separately on the left and right to reproduce suitable stereo sound (see Japanese Patent Publication No. 2021-090099, for example).

SUMMARY OF THE INVENTION

A pair of speakers may be connected with a cable for transmitting audio signals. A typical cable may have a certain degree of bending, which accommodates installation errors between the speakers. Typical cables have the flexibility that has no directivity and have a high degree of freedom in routing, so that they can be placed at a route that defines a bending.

Meanwhile, to realize even thinner electronic apparatuses that are requested, it is conceivable to apply a thin flat cable such as FFC for connection between the speakers. Flat cables, however, have directional flexibility, and thus the degree of freedom in routing is inferior to that of typical cables, and they may fail to sufficiently accommodate installation errors between speakers depending on the installation route. An excessively large bending can be formed to accommodate installation errors, which requires a correspondingly large space capacity and thus goes against the demand for miniaturization.

In view of the above problems, the present invention aims to provide an electronic apparatus with a thin chassis capable of favorably accommodating installation errors between a pair of speakers.

To solve the above-described problems and achieve the aim, an electronic apparatus according to the first aspect of the present invention includes: a chassis and a pair of speakers in the chassis, the pair of speakers being connected via a flat cable, the flat cable having a ridge fold line that is convex on one face and a valley fold line that is convex on the other face so that the ridge and valley fold lines extend in a direction intersecting an extension direction of the flat cable.

The above-described aspect of the present invention provides an electronic apparatus including a flat cable for connection between a pair of speakers, thereby having a thin chassis. The flat cable has a ridge fold line and a valley fold line. This favorably accommodates installation errors between the pair of speakers.

DETAILED DESCRIPTION OF THE INVENTION

The following describes an electronic apparatus according to one embodiment of the present invention in details, with reference to the drawings. The present invention is not limited to the following embodiment.

Figure 1:
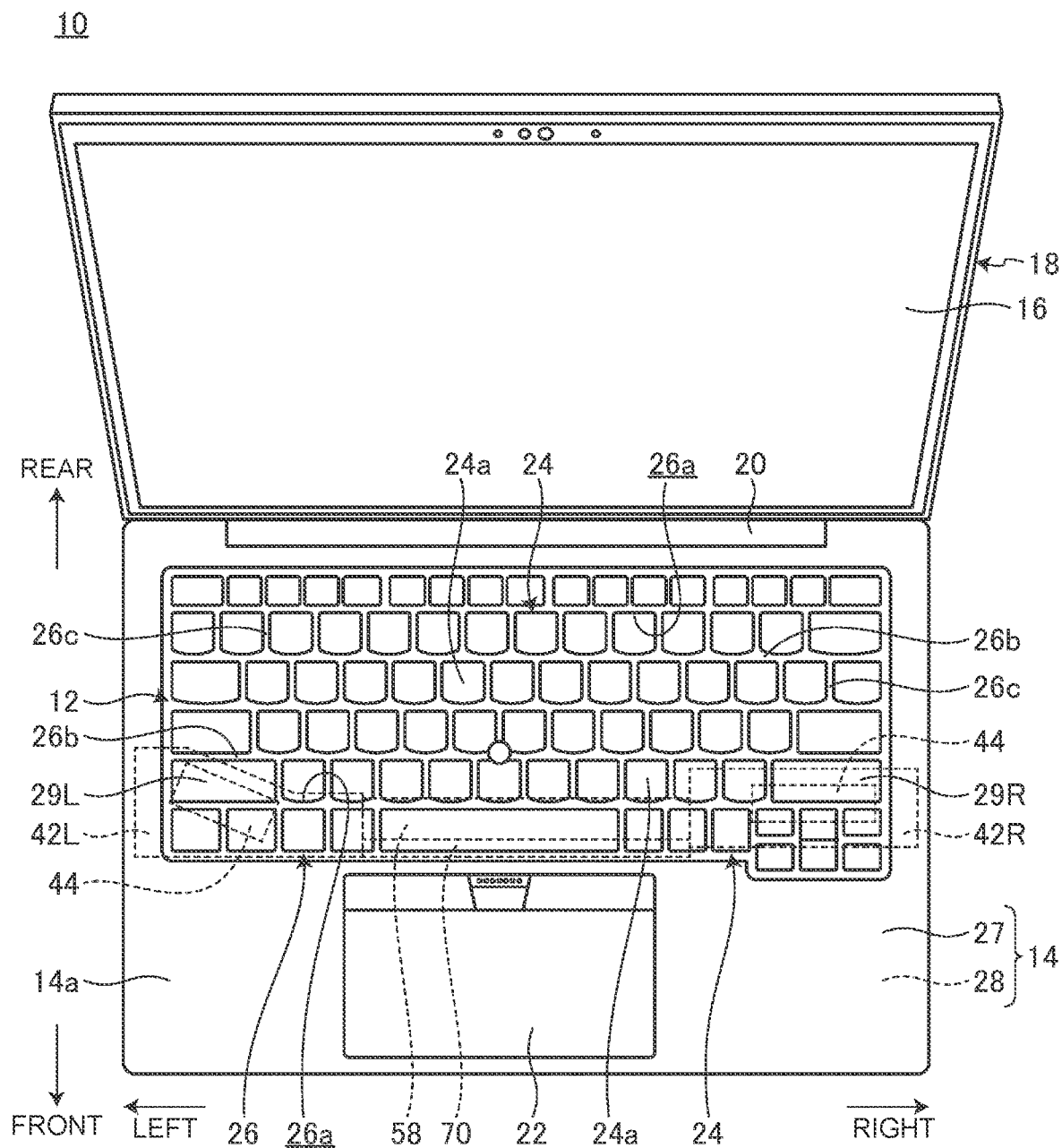
FIG. 1 is a perspective view of an electronic apparatus according to one embodiment of the present invention.

FIG. 1 is a perspective view of an electronic apparatus 10 according to one embodiment of the present invention. As illustrated in FIG. 1, the electronic apparatus 10 includes a chassis 14 with a keyboard 12 mounted thereon, and a display chassis 18 with a display 16 mounted thereon. This embodiment describes one example of the electronic apparatus 10 that is a clamshell-type laptop PC including the chassis 14 and the display chassis 18, which are relatively rotatably connected with a hinge 20. FIG. 1 illustrates the electronic apparatus with the display chassis 18 opening from the chassis 14 for use. The electronic apparatus 10 may be any apparatus as long as it has a pair of speakers within a chassis, and is also applicable to other electronic apparatuses such as a tablet PC, a mobile phone, a smartphone, or a portable game machine.

The following describes the chassis 14 and elements mounted on the chassis 14, including the keyboard 12, with reference to the direction viewed from the user using the keyboard 12 while viewing the display 16, where a part closer to the user is front, a part away from the user is rear, the thickness of the chassis is top and bottom, and the width is left and right.

The display chassis 18 is a flat box thinner than the chassis 14, and has the display 16 on the front face. For instance, the display 16 includes organic EL or liquid crystal. The display chassis 18 is connected to the rear end of the chassis 14 at the lower end via the hinge 20.

The chassis 14 is a thin, flat box with the keyboard 12 and touch pad 22 facing its top surface 14a. The keyboard 12 is placed close to the rear end of the top surface 14a to span almost the entire width of the top surface 14a, and the touch pad 22 is placed close to the front end, substantially in the center.

The keyboard 12 is supported at the top of the chassis 14. The keyboard 12 has a plurality of key switches 24. The keyboard 12 is of an isolation type with a frame 26 segmenting each of the keytops 24a of the key switches 24. The internal structure of keyboard 12 is described later (see FIG. 6).

The frame 26 is a netlike frame made of resin, metal, or other materials. The chassis 14 of the present embodiment includes an upper cover member 27 that defines the top surface 14a and four surrounding side faces, and a lower cover member 28 that closes the lower opening of the upper cover member 27. The frame 26 is integrally molded with the upper cover member 27, which defines the top surface 14a. The frame 26 may be separate from the upper cover member 27. The frame 26 has a plurality of key holes 26a, into each of which the corresponding keytop 24a is inserted to be movable vertically. In the frame 26, the keyholes 26a are surrounded by a horizontal frame section 26b extending in the left-right direction and a vertical frame section 26c extending in the front-rear direction.

The key switches 24 include two shift keys 29L and 29R. As is well known, the shift keys 29L and 29R are modifier keys, which are pressed down together with the other character keys to switch the character to be entered. The shift keys 29L and 29R are horizontally long with a distance between the left and right to facilitate operation with the little finger.

Figure 2:
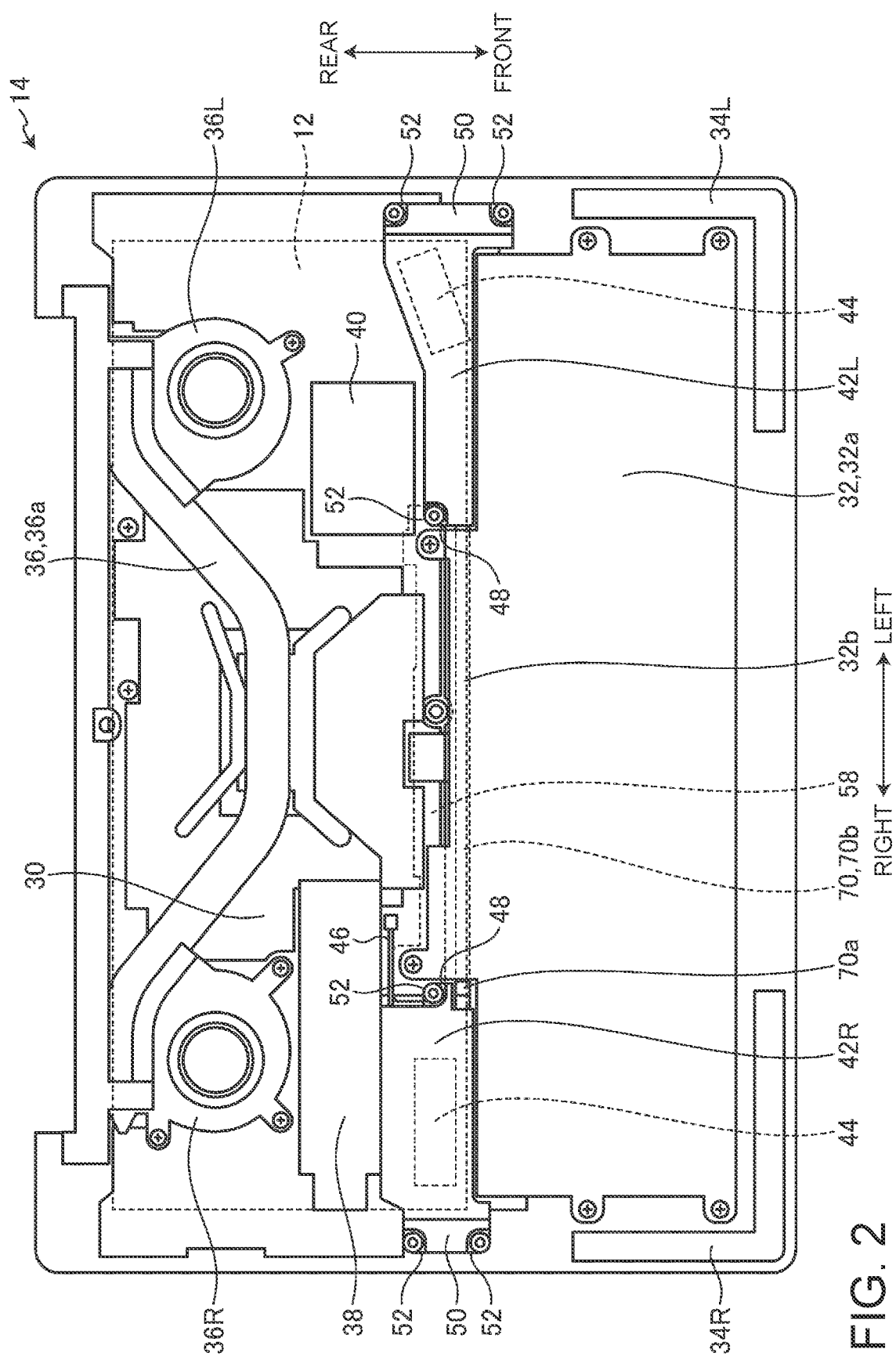
FIG. 2 is a bottom view of the chassis with the lower cover member removed.

FIG. 2 is a bottom view of the chassis 14 with the lower cover member 28 removed. As illustrated in FIG. 2, the chassis 14 accommodates a motherboard 30 close to the rear end and a battery 32 close to the front end. The battery 32 has a protrusion 32b at the center of the rear end of the main body 32a, and the protrusion 32b is adjacent to the motherboard 30. The protrusion 32a connects to the motherboard 30 and other components, and has a width approximately half of the total width of the battery 32 in the horizontal direction. The motherboard 30 is placed in an area that overlaps with the keyboard 12. The battery 32 is placed in an area that does not overlap with the keyboard 12, except for the protrusion 32b. The battery 32 has a width that occupies almost the entire width of the chassis 14.

The chassis 14 accommodates two L-shaped antenna units 34L and 34R extending from the front edge to the left and right sides. The motherboard 30 connects to a thermal module 36 for cooling the CPU and other components. The thermal module 36 has two left and right fans 36L and 36R and a heat pipe 36a. A solid state drive (SSD) 38 is placed in front of the right fan 36R, and a communication module 40 is placed in front of the left fan 36L.

The chassis 14 accommodates a pair of left and right speakers 42L and 42R capable of reproducing stereo sound. The pair of speakers 42L and 42R may be also collectively called a speaker 42. The speaker 42 is directed to emit sound upward, and includes a rectangular diaphragm 44 on the top surface for emitting sound. The diaphragm 44 may be divided into one for high-pitched sound and one for low-pitched sound. The left speaker 42L is placed behind the main body 32a of the battery 32 and occupies the section on the left of the protrusion 32b, and has an irregular shape having a center part that is slightly narrow and widening toward the left so as not to interfere with the communication module 40. The speaker 42L has the diaphragm 44 placed to be slightly inclined along the oblique side.

The right speaker 42R is placed between the main body 32a of the battery 32 and the SSD 38 and occupies the section on the right of the protrusion 32b, and has a substantially rectangular shape. The speaker 42R has a diaphragm 44 placed close to the right end with a horizontal orientation and without inclination. The speaker 42R is connected to the motherboard 30 via a harness 46.

The speaker 42 has an inner attachment tab 48 near the center and an outer attachment tab 50 on the lateral side. The outer attachment tab 50 has a stepped shape so that it is positioned slightly above other parts (see FIG. 4). The speaker 42 is provided with a total of three attachments 52, one on the inner attachment tab 48 and two on the outer attachment tab 50. The two attachments 52 on the outer attachment tab 50 are aligned in the front-rear direction. The speaker 42 is located below the keyboard 12, except for the outer attachment tab 50 (see FIG. 3). The left and right diaphragms 44 are located overlapping with the shift keys 29L and 29R. If the keyboard 12 is a full-size keyboard that includes a numeric keypad on the right, at least the left diaphragm 44 may be located overlapping with the shift key 29L.

Figure 3:
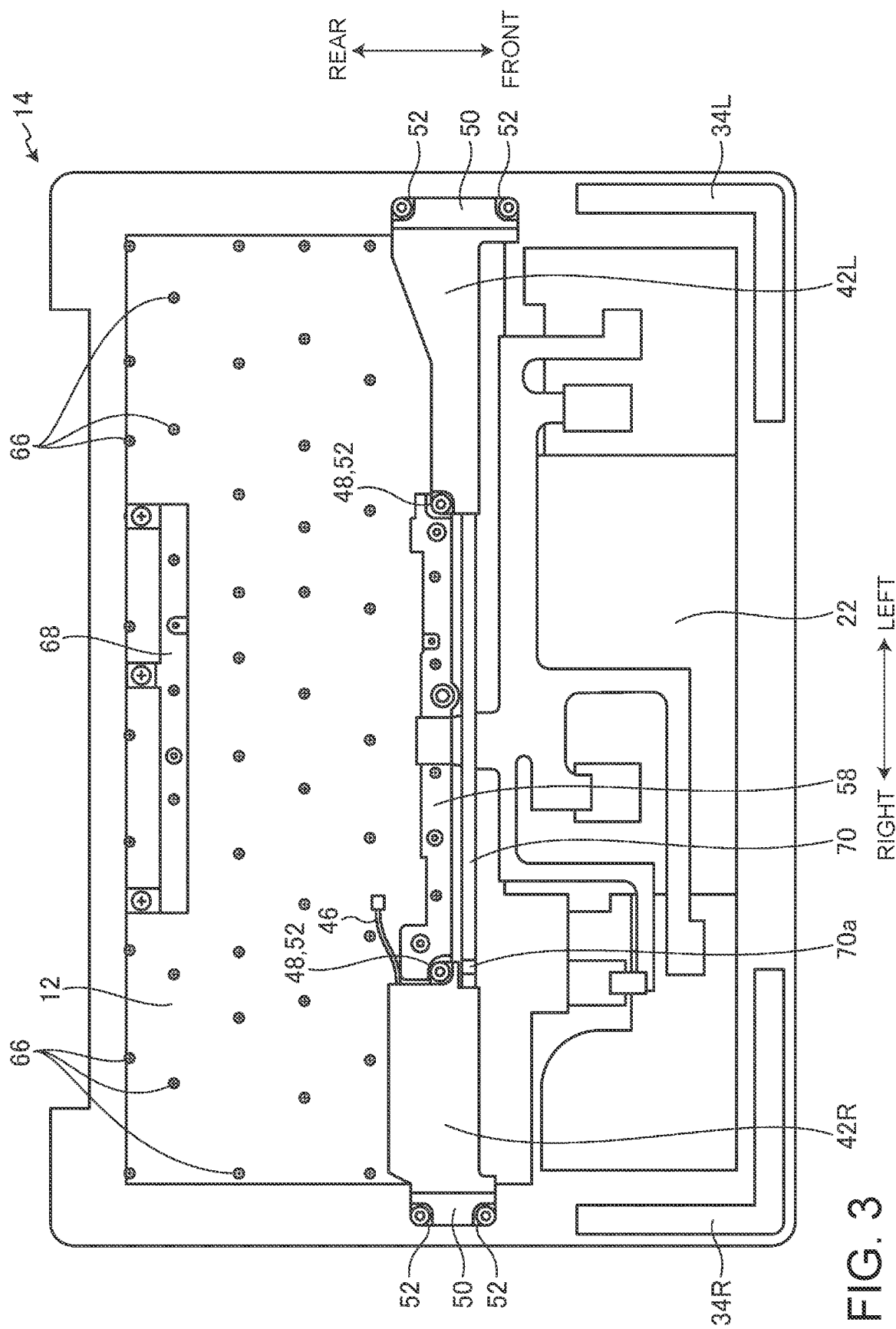
FIG. 3 is a bottom view of the chassis of FIG. 2 with the motherboard, battery, thermal module, SSD, and communication module removed.
Figure 4:
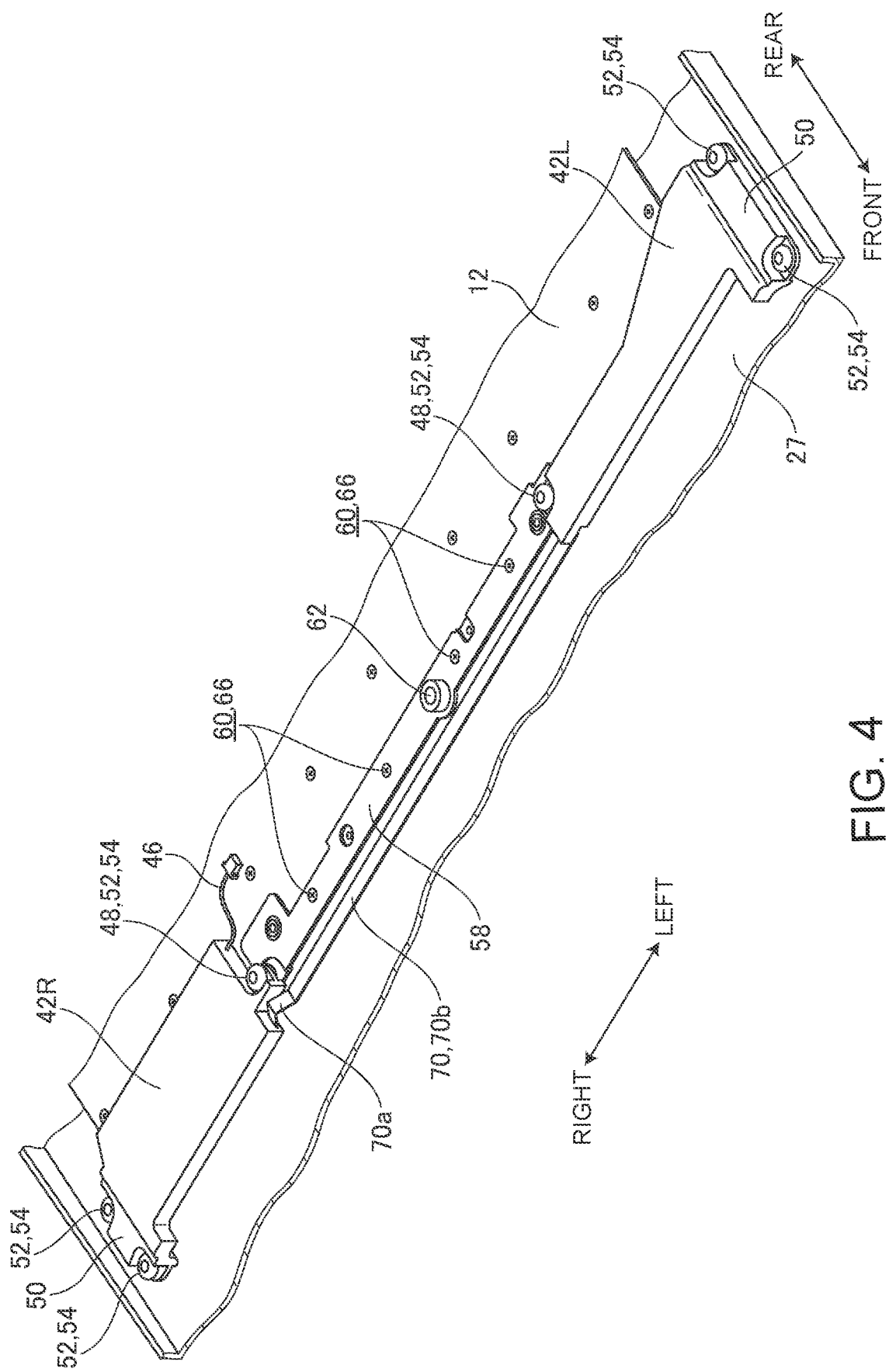
FIG. 4 is a perspective view illustrating the left and right speakers in the chassis and a portion therebetween.
Figure 5:
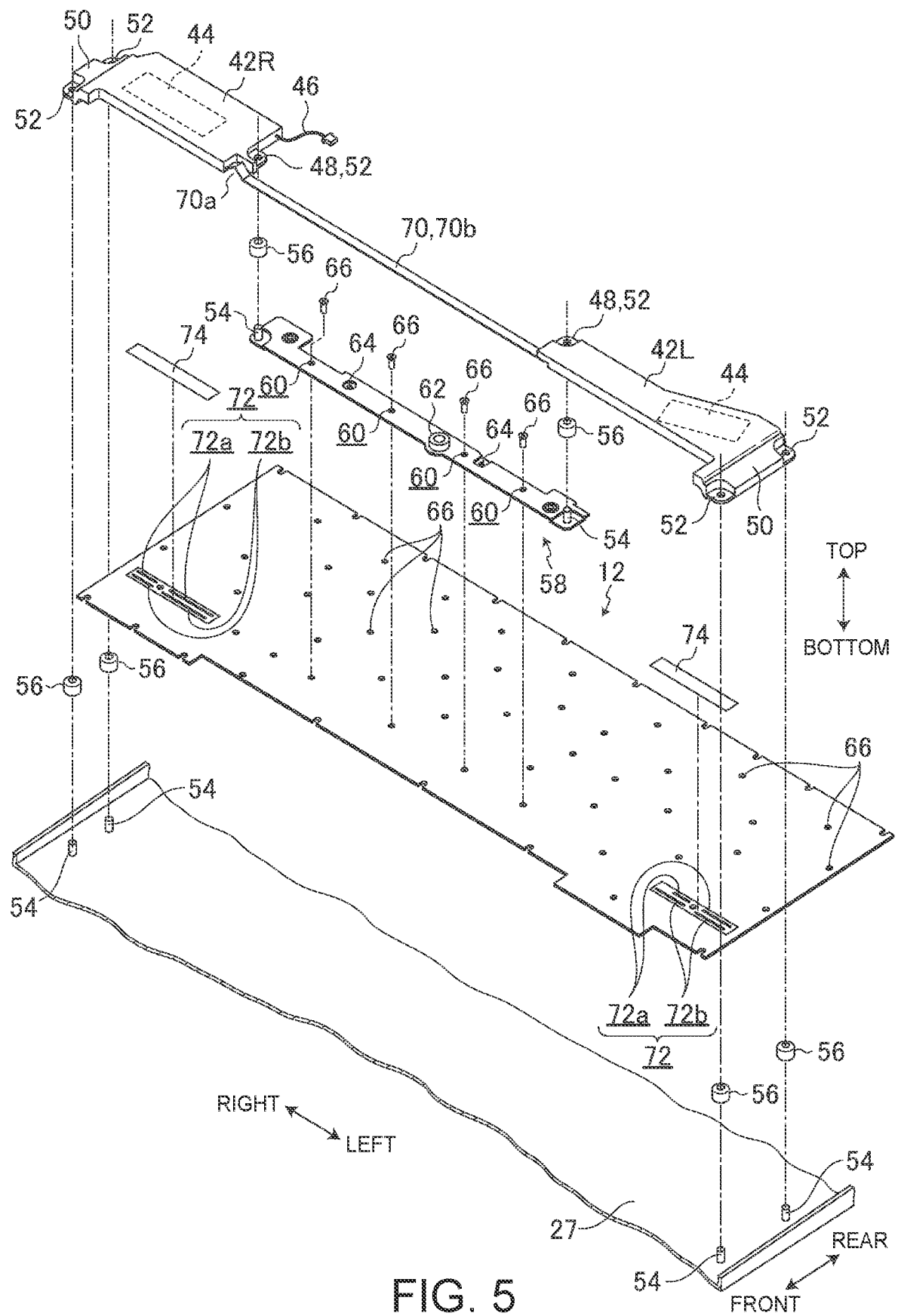
FIG. 5 is an exploded perspective view of the keyboard, the lower cover member, the left and right speakers and the bracket.

FIG. 3 is a bottom view of the chassis 14 of FIG. 2 with the motherboard 30, battery 32, thermal module 36, SSD 38, and communication module 40 removed. FIG. 4 is a perspective view illustrating the left and right speakers 42L and 42R in the chassis 14 and a portion therebetween. FIG. 5 is an exploded perspective view of the keyboard 12, the lower cover member 28, the left and right speakers 42L and 42R, and a bracket 58. FIG. 5 schematically illustrates the upper cover member 27, omitting the frame 26, the keyholes 26a and other components. The keyboard 12 is fastened to the frame 26 (see FIG. 1) with many screws 66.

Each of the outer attachment tabs 50 of the speakers 42L and 42R is elastically fixed by inserting pins 54 protruding downward from the upper cover member 27 into the pin holes formed in the two attachments 52 through small rubber tubes 56. The rubber tubes 56 are resin elastic members such as silicon rubber or rubber. Although the details are omitted, the pins 54 and rubber tubes 56 have a reasonably strong retaining structure against the attachments 52.

The bracket 58 is a horizontally long metal plate placed between the speaker 42L and the speaker 42R. The bracket 58 is thin, and overlaps with a portion of the protrusion 32 of the battery 32 in the thickness direction (see FIG. 2). The bracket 58 has downward pins 54 at both ends, four screw holes 60 distributed in the horizontal direction, a cover fixing boss 62 at the center, and two positioning portions 64. The bracket 58 is fixed to the lower surface of the keyboard 12 with screws 66 that each pass through the corresponding one of the four screw holes 60. The cover fixing boss 62 is used to fix the lower cover member 28. Both ends of the bracket 58 where the pins 54 are placed have a small gap from the lower surface of the keyboard 12.

The two pins 54 at both ends and the four screw holes 60, six in total, are almost equally spaced. That is, each pin 54 is appropriately spaced from the screw holes 60. The inner attachment tabs 48 of the speakers 42L and 42R are fixed by inserting the pins 54 at both ends of the bracket 58 into the pin holes formed in the attachments 52 through rubber tubes 56. This is the same as the fixing structure of the attachment 52 of each outer attachment tab 50 with the pins 54 on the upper cover member 27.

Each pin 54 and attachment 52 are fixed through the rubber tube 56, which elastically fixes them in the front-back, left-right, and top-bottom directions. This prevents vibrations of the acoustic output of the speaker 42 from transmitting to the chassis 14. This also realizes a floating structure, and thus serves as an audio insulator, whereby the sound quality of the speaker 42 improves.

The bracket 58 is fixed to the keyboard 12 with the screws 66 in the screw holes 60 located at different positions from the pins 54 fixed to the inner attachment tab 48. With this configuration, the vibrations of the speaker 42 are attenuated between the pins 54 and the screw holes 60, and do not transmit directly to the keyboard 12. This prevents the keytop 24a from resonating and does not give discomfort to the user. Both ends of the bracket 58 where the pins 54 are placed have a gap from the lower surface of the keyboard 12, so that no direct vibrations are applied to the keyboard 12. The bracket 58 is fixed with multiple (four in this embodiment) screw holes 60, so that vibrations applied to the keyboard 12 are distributed and no large vibrations are applied locally to the keyboard 12. The bracket 58 may be fixed to the keyboard 12 with double-sided tape having a certain length, which effectively fixes the bracket 58 at a plurality of locations, and a similar vibration distribution effect can be obtained.

Another bracket 68 (see FIG. 3) different from the bracket 58 and close to the rear end of the chassis 14 is fixed to the lower surface of the keyboard 12 with screws 66. This bracket 68 is used to fix the motherboard 30. Similar to the bracket 68, the bracket 58 may be used also to fix the motherboard 30.

The left and right speakers 42L and 42R are connected at their inner parts with a flat cable 70. The flat cable 70 transmits acoustic signals. The flat cable 70 and the bracket 58 are adjacent to each other in the front-rear direction, with the flat cable 70 on the front and the bracket 58 on the rear. The flat cable 70 is a flexible flat cable (FFC). The flat cable 70 will be further described later.

As illustrated in FIG. 5, the keyboard 12 has a plurality of sound transmission holes 72 near the left and right ends close to the front end. These sound transmission holes 72 are for transmitting the sound generated by the diaphragms 44 upward. The sound transmission holes 72 are in the form of slits long in the horizontal direction, and a plurality of them are formed in two rows at each of the left and right ends of the keyboard 12. These sound transmission holes 72 at two locations on the left and right are each closed by a sound-permeable waterproof membrane 74. For instance, the sound-permeable waterproof membrane 74 is a filter or a waterproof acoustic mesh sheet that has air permeability, sound permeability, and waterproofness, and allows the sound of the diaphragm 44 to pass through and prevents liquid and foreign matter from entering from the outside. Reference numeral 72a is assigned to the rear row of the sound transmission holes 72, and 72b is assigned to the front row.

Figure 6:
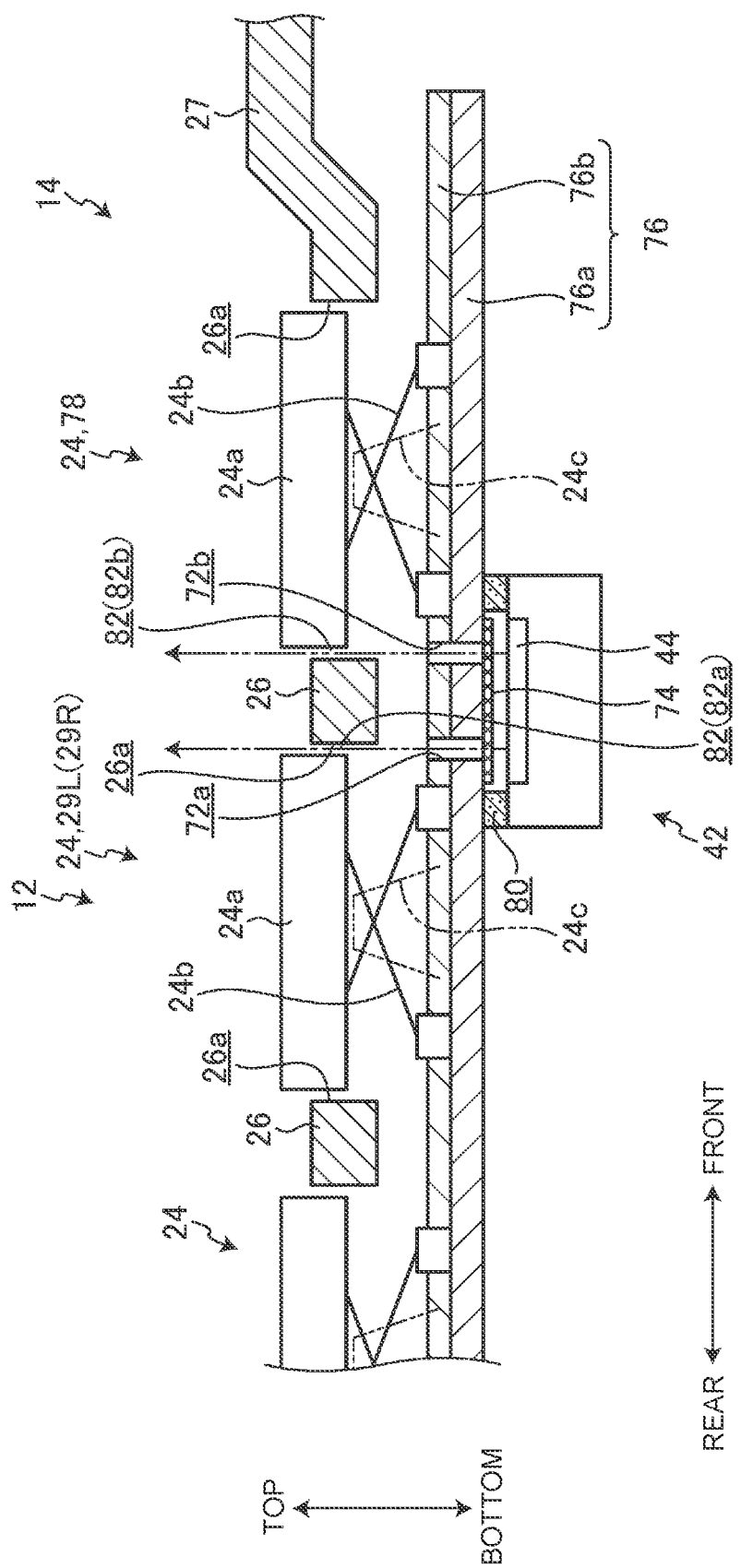
FIG. 6 is a partially enlarged schematic sectional view of the keyboard.

FIG. 6 is a partially enlarged schematic sectional view of the keyboard 12. The keyboard 12 includes a plate 76 and a plurality of key switches 24 on the plate 76. The plate 76 is formed by stacking a base plate 76a and a membrane sheet 76b. The plate 76 may further include a light guide plate and a light shielding plate. Each key switch 24 has a keytop 24a, a guide mechanism 24b that guides the keytop 24a to be movable vertically relative to the plate 76, and a rubber dome 24c. The keytop 24a serves as an operation section that is pressed by the user. The guide mechanism 24b is a pantograph mechanism that guides the keytop 24a vertically above the upper surface of the plate 76. The rubber dome 24c is an elastic member to press the membrane sheet 76b when the keytop 24a is pressed down, and to return the keytop 24a to the original position when the pressing force of the keytop 24a is released. Reference numeral 78 in FIG. 6 indicates a key (e.g., cursor key and control key) in front of the shift keys 29L and 29R. The keyboard 12 in this embodiment is of a membrane type, which may be of a mechanical type or a capacitive non-contact type. As illustrated in FIG. 1, the keyboard 12 is of a compact type without a numeric keypad, which may be of a full-size type with a numeric keypad and separately arranged cursor keys.

The speaker 42 is generally located below the shift key 29 and the adjacent front key 78. The diaphragm 44 is located below the area extending between the shift key 29 and the front key 78 so as to face the sound transmission holes 72. A frame-shaped sponge 80 surrounding the diaphragm 44 and the sound holes 72 is placed on the upper surface of the speaker 42. The sponge 80 prevents the vibrations of the speaker 42 from being transmitted to the plate 76, and also prevents water from spreading to the surroundings if the sound-permeable waterproof membrane 74 were torn and water entered below the plate 76.

Figure 7:
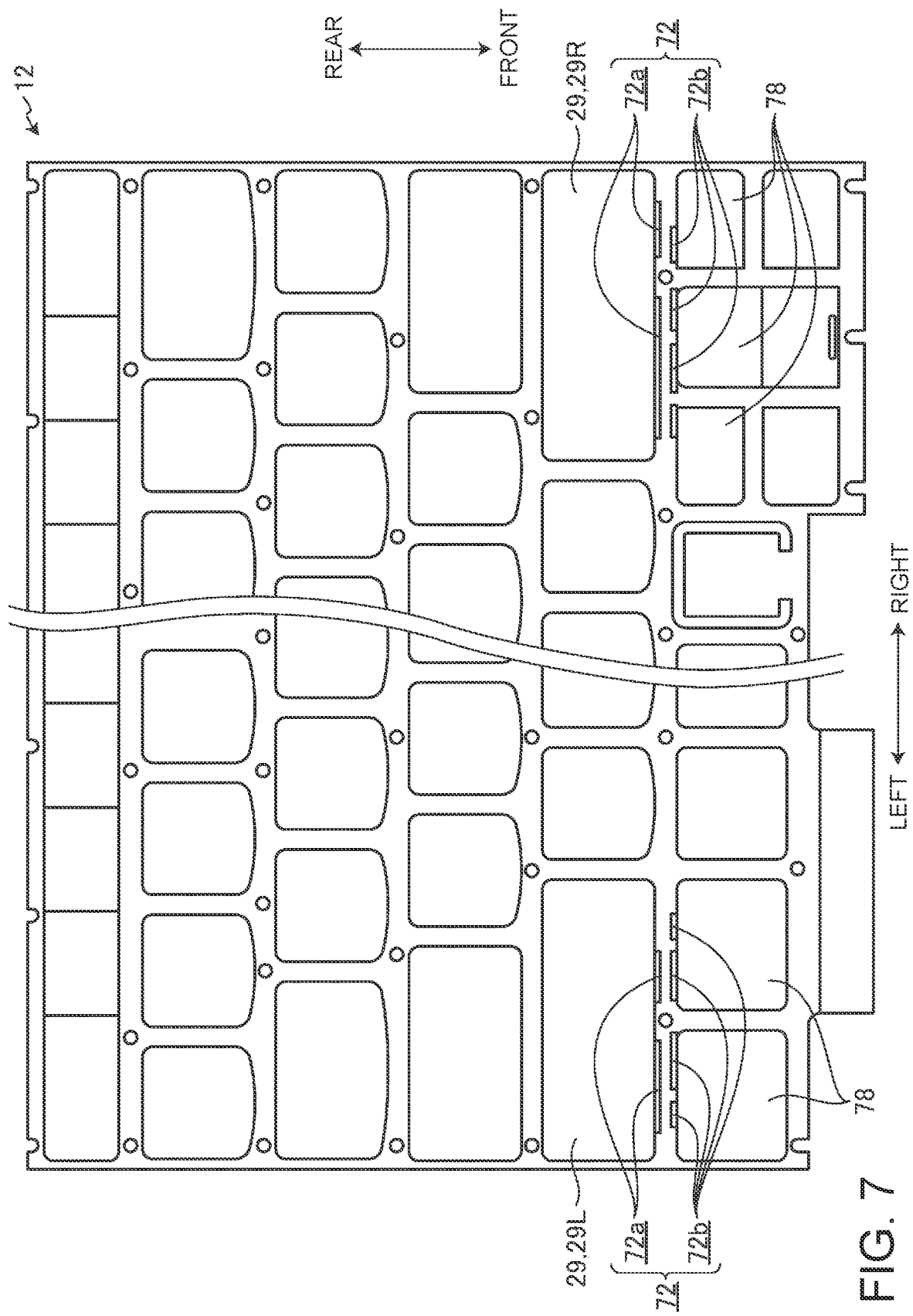
FIG. 7 is a plan view of the keyboard alone.
Figure 8:
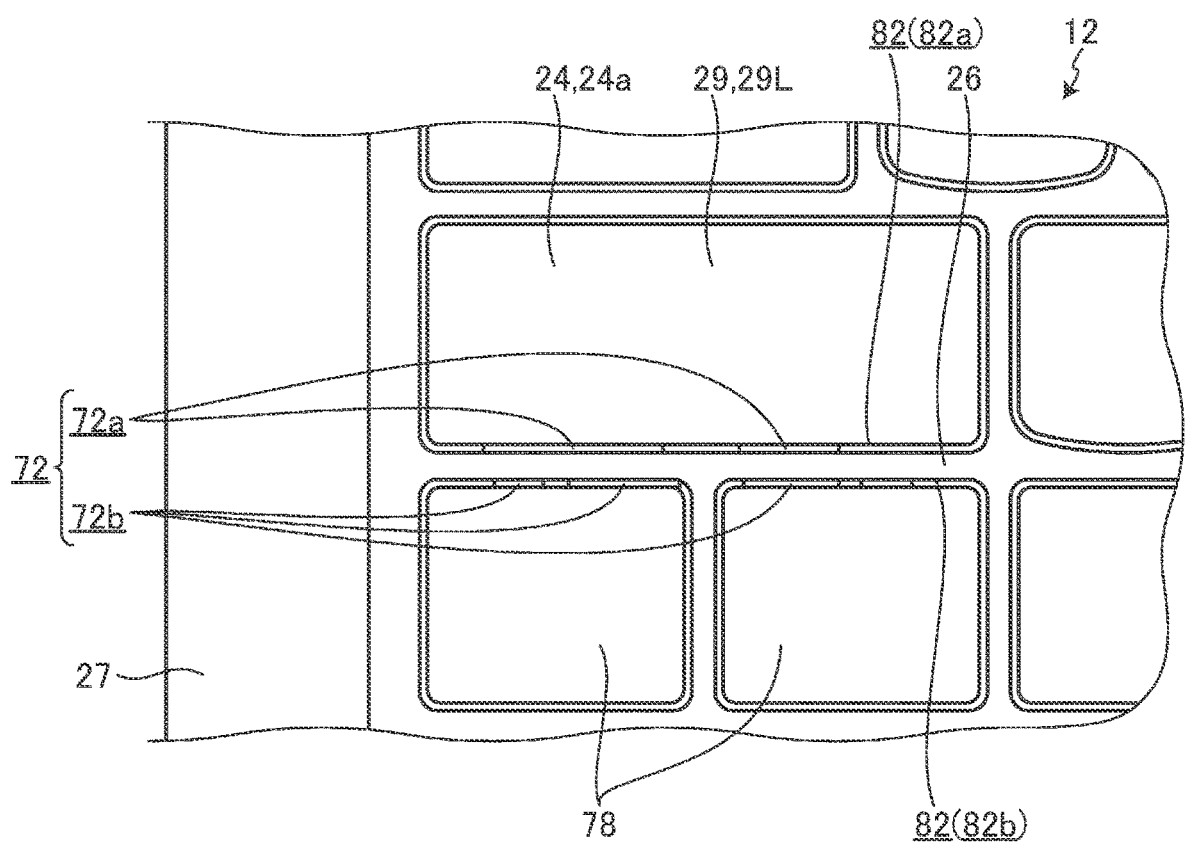
FIG. 8 is a plan view of the left shift key and its surroundings in the chassis.
Figure 9:
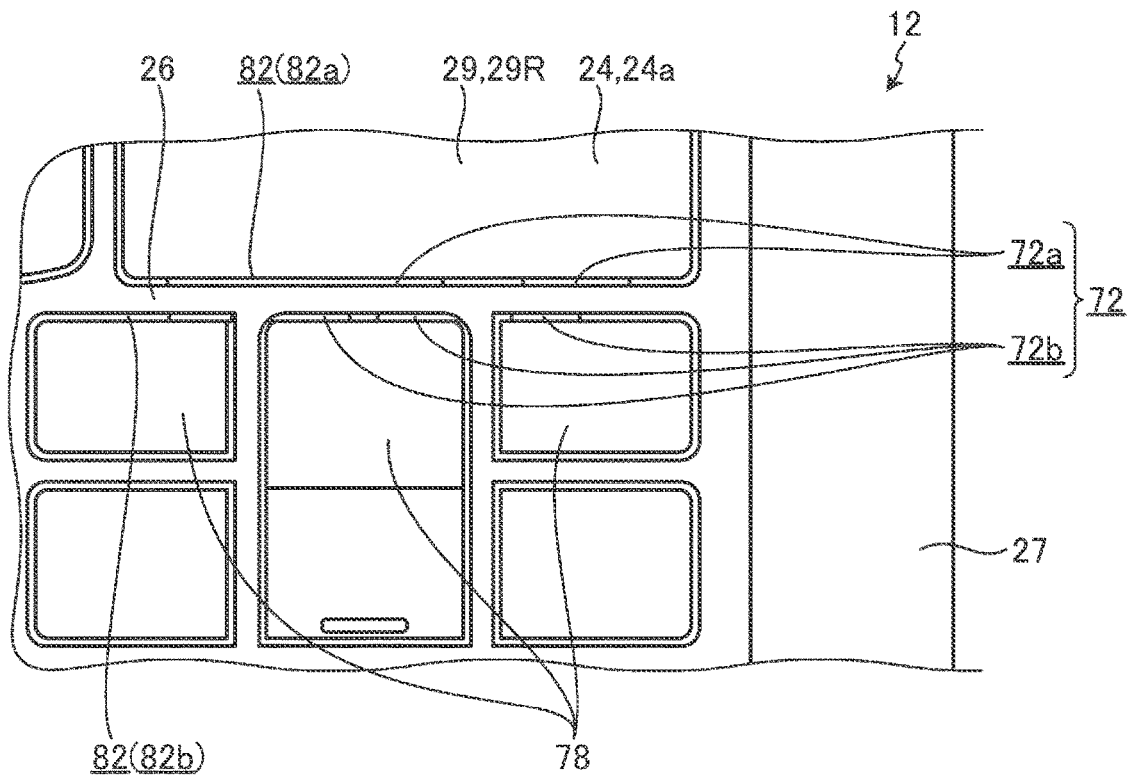
FIG. 9 is a plan view of the right shift key and its surroundings in the chassis.

FIG. 7 is a plan view of the keyboard 12 alone. FIG. 8 is a plan view of the left shift key 29L and its surroundings in the chassis 14. FIG. 9 is a plan view of the right shift key 29R and its surroundings in the chassis 14.

As illustrated in FIGS. 6 to 9, the sound transmission hole 72 is formed in the plate 76 at a position facing the gap 82 between the frame 26 and the keytop 24a. Specifically, the sound transmission hole 72a is located facing the gap 82a between the shift key 29 and the frame 26, and the ventilation hole 72b is located facing the gap 82b between the key 78 and the frame 26. This allows, as illustrated by the arrows in FIG. 6, the sound emitted upward from the diaphragm 44 to pass through the sound-permeable waterproof membrane 74 and the sound transmission hole 72 to exit upward from the gap 82. This transmits, to the user, a clear sound from the diaphragm 44 so that the sound is substantially unobstructed.

When boring holes in the upper cover member 27 and lower cover member, CNC machining is performed, and the machining time increases with the number of holes and the machining cost rises. In contrast, when forming the sound transmission holes 72 in the plate 76 as in the present embodiment, the holes are made at one time with pressing, so the machining time is shortened and costs are reduced. However, depending on the design conditions, separate sound transmission holes may be additionally made in the upper cover member 27 and the lower cover member 28.

As illustrated in FIG. 7, the sound transmission holes 72 are visible somewhat when the viewing the keyboard 12 alone. When the keyboard 12 is assembled into the chassis 14 as shown in FIGS. 8 and 9, they are covered by the frame 26 and are located in a recessed position. This is suitable for design because they are hardly visible. At least the diaphragm 44 of the speaker 42 is placed below the keyboard 12, and the chassis 14 has a layout margin in the area other than the keyboard 12. This facilitates the placement of the antenna units 34L and 34R (see FIG. 2), for example.

As illustrated in FIGS. 8 and 9, the sound transmission hole 72a is formed at a position facing the gap 82a between the keytop 24a of the shift key 29 and the frame 26. Although the left and right shift keys 29 of the keyboard 12 may have different lengths depending on the language supported, the sound transmission hole 72a can be formed to be appropriately long according to the horizontally elongated shift key 29, allowing sound to pass through easily.

Figure 10:
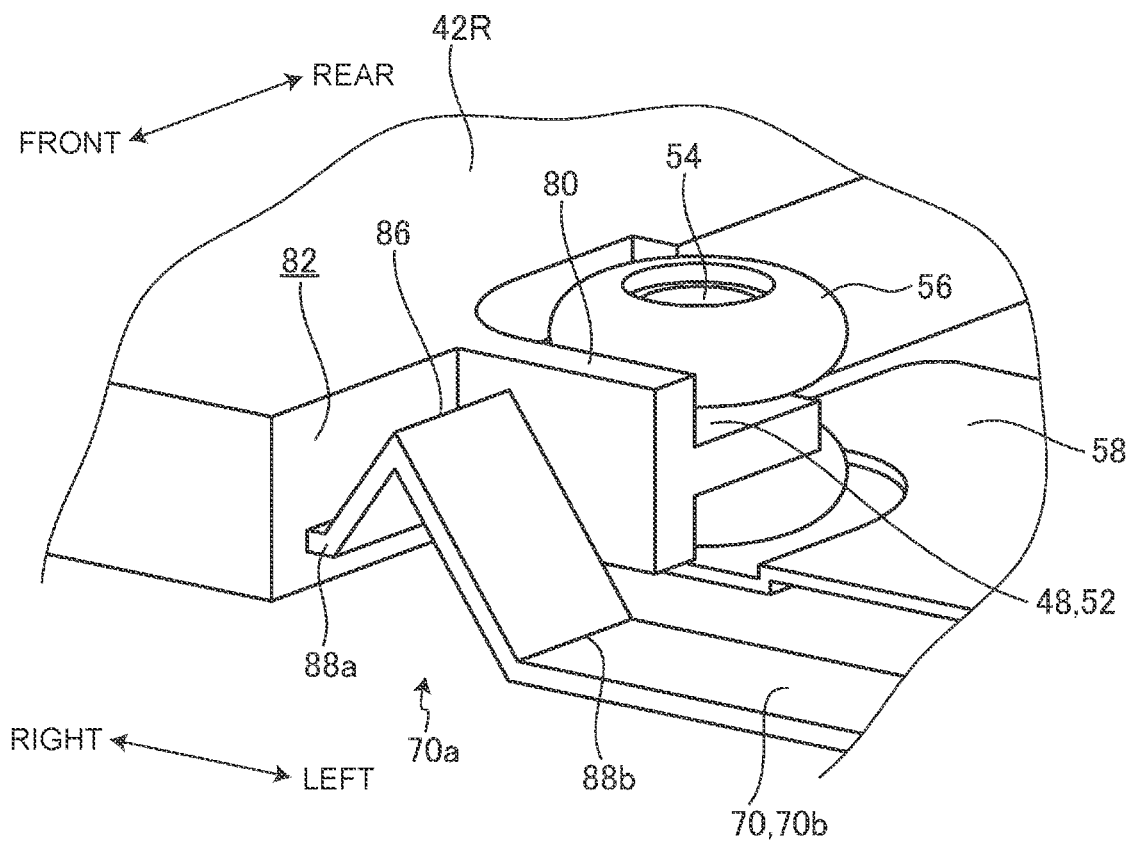
FIG. 10 is an enlarged perspective view of the connection portion between the right speaker and the flat cable.

FIG. 10 is an enlarged perspective view of the connection portion between the right speaker 42R and the flat cable 70. As illustrated in FIGS. 4 and 10, the speaker 42R has a notch 82 at the front inner end, separating from the inner attachment tab 48 with a wall 80 therebetween. The flat cable 70 extends in the left-right direction to linearly connect the speaker 42R and the speaker 42L, and is short enough to reduce cost. The flat cable 70 is placed along the flat surface of the chassis 14, and contributes to making the chassis 14 thinner.

The flat cable 70 has a folded portion 70a in the notch 82 at the right end, and has a long extending portion 70b other than the folded portion 70a so that the long extending portion overlaps with the protrusion 32a of the battery 32 in plan view (see FIG. 2), which is space efficient. The flat cable 70 is thin and can be placed to pass between the protrusion 32b of the battery 32 and the keyboard 12. The folded portion 70a is extremely short compared to the total length of the flat cable 70. Specifically, the total length of the flat cable 70 is about 150 mm, for example, and the folded portion 70a is about 9 mm along the corrugation.

The folded portion 70a is formed at a position that does not overlap with the battery 32, and has a valley fold line 88a, a ridge fold line 86, and a valley fold line 88b that are formed in order closer to the housing of the speaker 42R so that the folds extend in the front-rear direction. The ridge fold line 86 has a convex on the lower surface, and the valley fold lines 88a and 88b have a concave on the lower surface and a convex on the upper surface. These ridge fold line 86 and valley fold lines 88a and 88b are different from curves having an indefinite shape, and have stable line shapes. These ridge fold line 86 and valley fold lines 88a, 88b may be formed by an automatic machine or a jig, or may be formed manually by an operator.

Figure 11:
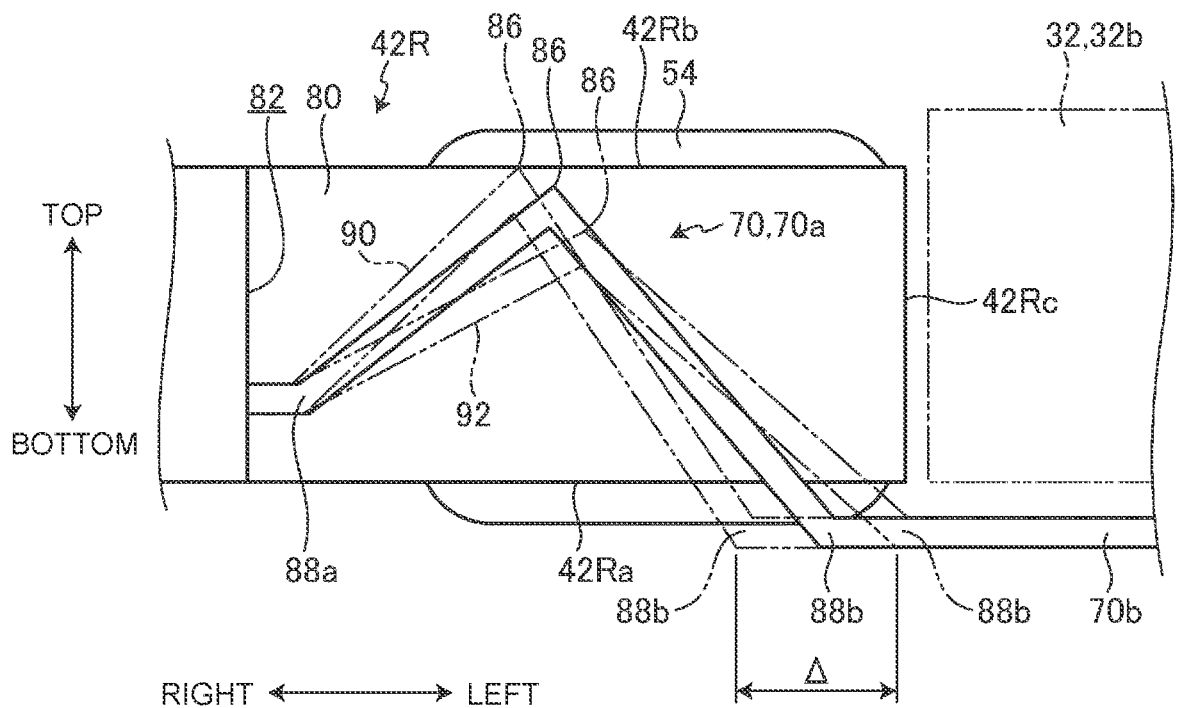
FIG. 11 is a side view of the folded portion and its surroundings.

FIG. 11 is a side view of the folded portion 70a and its surroundings. The flat cable 70 is connected to the speaker 42R at a slightly upper position within the notch 82. The long extending portion 70b of the flat cable 70 is located slightly above the upper surface 42Ra of the speaker 42R, so that it can be easily stacked on the protrusion 32b of the battery 32. FIG. 11 illustrates the extent of the protrusion 32b by the dash-dot-dot lines.

When the assembly positions of the speakers 42R and 42L match the design values, the ridge fold line 86 is located approximately in the middle of the two valley fold lines 88a and 88b in the horizontal direction, and is located slightly above the lower surface 42Rb of the speaker 42R in the vertical direction. The valley fold line 88b is located slightly to the right of the inner side face 42Rc of the speaker 42R. In this case, the ridge fold line 86 are at approximately 90 degrees, and the valley fold lines 88a and 88b are at approximately 135 degrees in this embodiment.

When the speaker 42R and the speaker 42L are placed closest to each other within the expected assembly position error range, the angles of the ridge fold line 86 and valley fold lines 88a and 88b of the folded portion 70a will be slightly smaller, making them the route illustrated by the dash-dot-dot line 90. In this case, the valley fold line 88b moves slightly to the right. The ridge fold line 86 moves slightly downward, but is set so as not to reach beyond the lower surface 42Rb.

When the speaker 42R and the speaker 42L are placed farthest apart within the expected assembly position error range, the angles of the ridge fold line 86 and valley fold lines 88a and 88b of the folded portion 70a will be slightly larger, making them the route illustrated by the dash-dot-dot line 92. In this case, the ridge fold line 86 moves slightly upward. The valley fold line 88b moves slightly to the left, but is set so as not to reach beyond the inner side face 42Rc of the speaker 42R.

The valley fold line 88b has a difference A in the horizontal direction between the position at the dash-dot-dot line 90 and the position at the dash-dot-dot line 92, for example, about 2 mm, and can suitably accommodate the installation error between the speakers 42L and 42R within this width range.

The folded portion 70a can be placed in the small notch 82 without entering the space for other parts. Note that if the folded portion 70a were to have a curved shape without a fold line, the curved portion would generate a force that tries to return to its original shape depending on its elasticity, and would apply lateral pressure to the speakers 42L and 42R. In contrast, the folded portion 70a is stable with the ridge fold line 86 and valley fold lines 86a and 86b that are folded to slightly shorten the apparent length of the flat cable 70 by that folding amount, which hardly applies pressure to the speakers 42L and 42R.

In the above-described embodiment, the folded portion 70a has one ridge fold line 86 and two valley fold lines 88a and 88b, and depending on design conditions, it may have more folds. The valley fold line 88a in the very vicinity of the housing of the speaker 42R may be omitted. That is, as long as one or more ridge fold lines and one or more valley fold lines are provided, a corresponding effect of accommodating surplus length can be obtained. The ridge fold line 86 and valley fold lines 88a, 88b are formed at the folded portion 70a to extend in the front-back direction perpendicular to the horizontal direction in which the flat cable 70 extends. Depending on the design conditions, they may be formed in a direction intersecting with the horizontal direction, from a which corresponding effect of accommodating surplus length can be obtained. For instance, the flat cable 70 may be a flexible printed circuit (FPC). The speaker 42 is located below the keyboard 12 in this embodiment, and it may be located elsewhere.

As described above, the pair of speakers 42L and 42R are elastically fixed directly or indirectly to the chassis 14 via the rubber tubes 56, which are elastic resin members. The flat cable 70 hardly applies pressure to the speakers 42L and 42R due to the action of the ridge fold line 86 and valley fold lines 88a and 88b, and thus the rubber tubes 56 are not elastically deformed. Thus, this does not interfere with the above action by the rubber tubes 56 or not degrade the rubber tubes 56.

The present invention is not limited to the above-described embodiments, and can be modified freely without deviating from the scope of the present invention.

The invention claimed is:

1. An electronic apparatus including a chassis and a pair of speakers in the chassis, wherein the pair of speakers are connected via a flat cable, the flat cable having a ridge fold line that is convex on one face and a valley fold line that is convex on another face so that the ridge and valley fold lines extend in a direction intersecting an extension direction of the flat cable, wherein the chassis has a flat shape with a flat surface, the flat cable is disposed along the flat surface and partially overlaps a battery, and the ridge fold line and valley fold line do not overlap with the battery.

2. The electronic apparatus according to claim 1, wherein the chassis has a keyboard, and the flat cable is between the battery and the keyboard.

3. The electronic apparatus according to claim 1, wherein the pair of speakers are elastically fixed to the chassis via a resin elastic member at least in the extension direction of the flat cable.

* * * * *